United States Patent
Iwata et al.

(10) Patent No.: US 6,973,004 B2
(45) Date of Patent: Dec. 6, 2005

(54) MEMORY DEVICE INCLUDING BACKUP MEMORY FOR SAVING DATA IN STANDBY MODE

(75) Inventors: Jun Iwata, Kawasaki (JP); Shoji Taniguchi, Kawasaki (JP); Koichi Kuroiwa, Kawasaki (JP); Yoshikazu Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 70 days.

(21) Appl. No.: 10/346,103

(22) Filed: Jan. 17, 2003

(65) Prior Publication Data

US 2003/0146462 A1    Aug. 7, 2003

(30) Foreign Application Priority Data

Feb. 6, 2002    (JP) .............................. 2002-029171

(51) Int. Cl.[7] .............................................. G11C 7/00
(52) U.S. Cl. ...................... 365/229; 365/228
(58) Field of Search ................. 365/226, 228, 365/229 O

(56) References Cited

U.S. PATENT DOCUMENTS

| 5,524,248 A | * | 6/1996 | Parks et al. ................... 713/324 |
| 5,978,922 A | * | 11/1999 | Arai et al. .................... 713/323 |
| 2002/0091978 A1 | * | 7/2002 | Higashida .................... 714/726 |

FOREIGN PATENT DOCUMENTS

JP    2001-093275    4/2001

* cited by examiner

Primary Examiner—VanThu Nguyen
(74) Attorney, Agent, or Firm—Arent Fox PLLC

(57) ABSTRACT

A semiconductor device that quickly saves data stored in an area to which power is supplied intermittently. Power is supplied intermittently to a first area. Power is supplied continuously to a second area. A memory is located in the second area. A save circuit saves data used in the first area in the memory before the supply of power being stopped. A restoration circuit restores data which has been saved in the memory to a predetermined circuit in the first area. A power supply control circuit supplies power to the memory if data has been saved in the memory. Otherwise the power supply control circuit stops the supply of power to the memory.

2 Claims, 17 Drawing Sheets

MEMORY DEVICE INCLUDING BACKUP MEMORY FOR SAVING DATA IN STANDBY MODE

CROSS-REFERENCE TO RELATED APPLICATIONS

This application is based on, and claims priority to, Japanese Application No. 2002-029171, filed Feb. 6, 2002, in Japan, and which is incorporated herein by reference.

BACKGROUND OF THE INVENTION (1) Field of the Invention

This invention relates to a semiconductor device and an electronic device and, more particularly, to a semiconductor device including a first area to which power is supplied intermittently and a second area to which power is supplied continuously and an electronic device including a first circuit to which power is supplied intermittently and a second circuit to which power is supplied continuously.

(2) Description of the Related Art

With many portable electronic devices, a technique for reducing consumption of power by stopping the supply of power to circuits not used is adopted. With cellular telephones, for example, consumption of power is reduced by stopping the supply of power to a modem (modulator/demodulator) and the like except at call time to lengthen the life of a battery. Sometimes this technique is called an intermittent receiving method.

Under this intermittent receiving method, data which has been stored in a register, a memory, and the like must be saved before stopping the supply of power. Under conventional intermittent receiving methods, data is read before stopping the supply of power and is saved in a memory to which power is supplied continuously. When the supply of power is resumed, the data which has been stored in the memory is read and is restored.

FIG. 13 is a view for describing a conventional intermittent receiving method.

In this example, a unit comprises a central processing unit (CPU) 10, a dual port random access memory (DPRAM) 11, a system bus 12, and a large scale integrated circuit (LSI) 13.

The CPU 10 controls each section of the device according to programs which have been stored in the DPRAM 11, and performs various operations.

The DPRAM 11 has stored programs executed by the CPU 10 and data.

The system bus 12 connects the CPU 10, DPRAM 11, and LSI 13 to one another so that data can be exchanged among them.

The LSI 13 includes an intermittent control section 14 and a power intermittence area 15. The LSI 13 encodes data to be sent and decodes received data.

The intermittent control section 14 performs, the process of intermittently supplying power to the power intermittence area 15.

The power intermittence area 15 includes a DPRAM 16 and a modem 17. The power intermittence area 15 is an area to which power is supplied intermittently under the control of the intermittent control section 14.

The DPRAM 16 temporarily stores data when the modem 17 processes it.

The modem 17 performs the process of encoding and decoding data.

Now, operation in the above conventional intermittent receiving method will be described.

First, operation performed when data is saved will be described.

FIG. 14 is a flow chart for describing operation performed when data is saved. The following steps will be performed according to this flow chart.

[Step S10] The modem 17 receives a request to begin intermittent control from the intermittent control section 14 (see (1) in FIG. 15).

[Step S11] The modem 17 notifies the CPU 10 that it received the request to begin intermittent control (see (2) in FIG. 15).

[Step S12] The CPU 10 performs the process of releasing the DPRAM 11 to save data which has been stored in the modem 17 (see (3) in FIG. 15).

[Step S13] The CPU 10 notifies the modem 17 that the DPRAM 11 was released (see (4) in FIG. 15).

[Step S14] The modem 17 saves the data in the DPRAM 11 via the system bus 12 (see (5) in FIG. 15).

[Step S15] When intermittent control is begun, power to the power intermittence area 15 is turned off.

By performing the above process, data which has been stored in the modem 17 can be saved in the DPRAM 11.

Now, a process performed when data which has been saved in the DPRAM 11 is restored to the modem 17 will be described.

FIG. 16 is a flow chart for describing the process of restoring data which has been saved in the DPRAM 11 to the modem 17. The following steps will be performed according to this flow chart.

[Step S30] The intermittent control section 14 notifies the modem 17 of a request to terminate intermittent control and power is turned on (see (1) in FIG. 17).

[Step S31] The modem 17 performs setting processes at intermittent control termination time.

[Step S32] The modem 17 notifies the CPU 10 that it begins a data restoration process (see (2) in FIG. 17).

[Step S33] The modem 17 restores data via the system bus 12 (see (3) in FIG. 17).

[Step S34] The modem 17 notifies the CPU 10 that the restoration process is completed (see (4) in FIG. 17).

[Step S35] After receiving the notification of termination, the CPU 10 initializes the DPRAM 11 (see (5) in FIG. 17).

By performing the above process, data which has been saved in the DPRAM 11 can be restored to the modem 17.

As described above, intermittent receiving enables a reduction in consumption of power by intermittently supplying power to the power intermittence area 15 at need.

Under the conventional method, however, data must be transferred by the CPU 10 located outside the LSI 13. This will increase the load on the CPU 10.

Moreover, the system bus 12 is used to transfer data. Therefore, no other pieces of data can be transferred before the transfer of the data is completed.

SUMMARY OF THE INVENTION

The present invention was made under the background circumstances as described above. An object of the present invention is to provide a semiconductor device with an area power is supplied intermittently to and an electronic device with a circuit power is supplied intermittently to which can save and restore data without increasing the load on a system.

In order to achieve the above object, a semiconductor device including a first area to which power is supplied intermittently and a second area to which power is supplied continuously is provided. This semiconductor device comprises a memory located in the second area, a save circuit for saving data used in the first area in the memory before the supply of power being stopped, and a restoration circuit for restoring data which has been saved in the memory to a predetermined circuit in the first area.

Furthermore, in order to achieve the above object, an electronic device including a first circuit to which power is supplied intermittently and a second circuit to which power is supplied continuously is provided. This electronic device comprises a memory located in the second circuit, a save circuit for saving data used in the first circuit in the memory before the supply of power being stopped, and a restoration circuit for restoring data which has been saved in the memory to a predetermined portion in the first circuit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will now be described with reference to the drawings.

Figure 1:
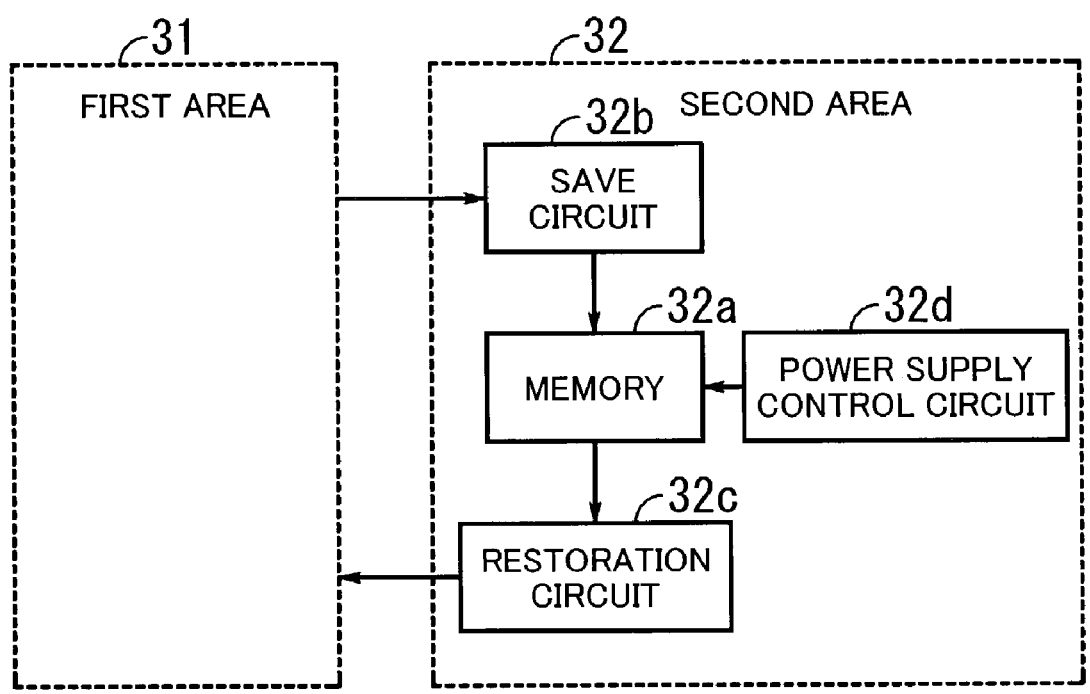
FIG. 1 is a view for describing the principles underlying operation in the present invention.

FIG. 1 is a view for describing the principles underlying operation in the present invention.

As shown in FIG. 1, a semiconductor device according to the present invention comprises a first area 31 and a second area 32. A memory 32a, a save circuit 32b, a restoration circuit 32c, and a power supply control circuit 32d are located in the second area 32.

Power is supplied intermittently to the first area 31.

Power is supplied continuously to the second area 32.

The memory 32a is located in the second area 32. As described later, the memory 32a has a minimum storage capacity necessary for storing data which needs to be saved of data used in the first area 31.

The save circuit 32b saves data used in the first area 31 in the memory 32a before the supply of power to the first area 31 is stopped.

The restoration circuit 32c restores data saved in the memory 32a to a predetermined circuit in the first area 31 when power is supplied again to the first area 31.

The power supply control circuit 32d stops the supply of power to the memory 32a after data being restored by the restoration circuit 32c and begins the supply of power to the memory 32a before the saving of data being begun by the save circuit 32b.

Now, operation in FIG. 1 will be described.

First, operation performed when the supply of power to the first area 31 is stopped will be described.

When the supply of power to the first area 31 is stopped, data, which is used in the first area 31 and which will be needed again in the case of the supply of power being resumed, must be saved in the memory 32a. This process will be performed in compliance with the following procedures.

That is to say, the save circuit 32b obtains data which will be needed in the case of the supply of power being resumed of data stored in a register and memory (not shown) in the first area 31 and saves it in the memory 32a. In this case, information indicative of a storage location, together with the above data, should be stored for convenience of restoring the data.

When the saving of the data is completed, the supply of power to the first area 31 is stopped and circuits located in the first area 31 stop operating. Therefore, data stored in registers and memories in this area will be lost.

Next, operation performed when the supply of power to the first area 31 is resumed will be described.

When the supply of power to the first area 31 is resumed, data saved in the memory 32a must be restored. This process will be performed in compliance with the following procedures.

That is to say, the restoration circuit 32c restores data stored in the memory 32a to a predetermined circuit in the first area 31. In this case, a location to which the data should be restored can be specified easily by referring to information indicative of the storage location.

When the restoring of the data is completed, the power supply control circuit 32d stops the supply of power to the memory 32a. As a result, the memory 32a stops operating and unnecessary consumption of power can be reduced.

As described above, with the semiconductor device according to the present invention the dedicated memory 32a for saving data is located in the semiconductor device and data is saved in the memory 32a at the time of the supply of power to the first area 31 being stopped. As a result, the storage capacity of the memory 32a can be minimized according to the amount of data to be saved. Data therefore can be saved without increasing the scale of a circuit.

Moreover, the semiconductor device according to the present invention includes the power supply control circuit 32d to supply power only when data has been saved in the memory 32a. Therefore, the amount of power consumed by the memory 32a can be reduced.

In FIG. 1, the power supply control circuit 32d stops the supply of power only to the memory 32a. However, it is a matter of course that the power supply control circuit 32d may stop the supply of power to the save circuit 32b and restoration circuit 32c.

Now, embodiments of the present invention will be described.

Figure 2:
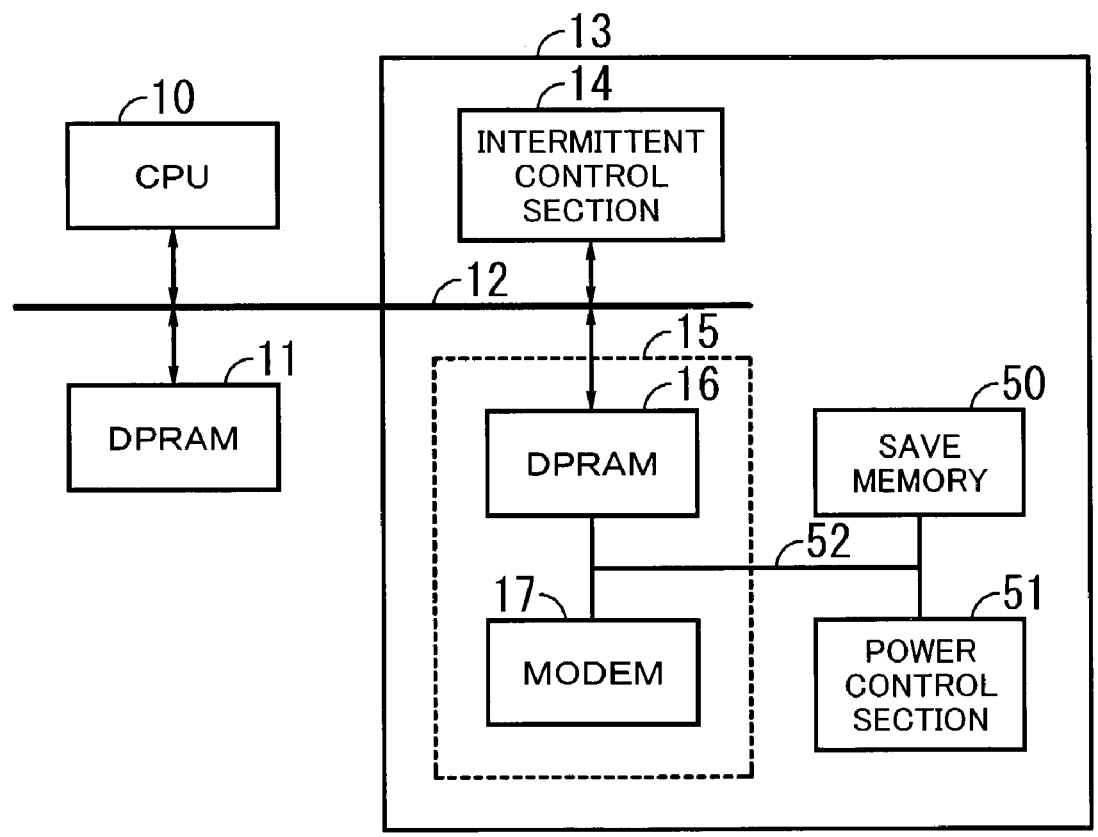
FIG. 2 is a view showing the structure of an embodiment of the present invention.

FIG. 2 is a view showing the structure of an embodiment of the present invention. As shown in FIG. 2, a unit according to an embodiment of the present invention comprises a CPU 10, a DPRAM 11, a system bus 12, and an LSI (semiconductor device) 13.

The CPU 10 controls each section of the device according to programs which have been stored in the DPRAM 11, and performs various operations.

The DPRAM 11 has stored programs executed by the CPU 10 and data.

The system bus 12 connects the CPU 10, DPRAM 11, and LSI 13 to one another so that data can be exchanged among them.

The LSI 13 includes an intermittent control section 14, a power intermittence area 15, a save memory 50, a power control section 51, and a bus 52. The LSI 13 encodes data to be sent and decodes received data.

The intermittent control section 14 performs the process of intermittently supplying power to the power intermittence area 15.

The power intermittence area 15 includes a DPRAM 16 and a modem 17. The power intermittence area 15 is an area to which power is supplied intermittently.

The DPRAM 16 temporarily stores data when the modem 17 processes it.

The modem 17 performs the process of encoding and decoding data.

Data (hereinafter referred to as work data), which is used by the modem 17 and which will be needed when the supply of power is resumed, is saved in the save memory 50. The storage capacity of the save memory 50 is set to a minimum capacity according to the amount of work data to be stored.

The power control section 51 controls the supply of power to the save memory 50.

The bus 52 connects the DPRAM 16, modem 17, save memory 50, and power control section 51 to one another so that data can be exchanged among them.

Now, operation in the above embodiment will be described.

Figure 3:
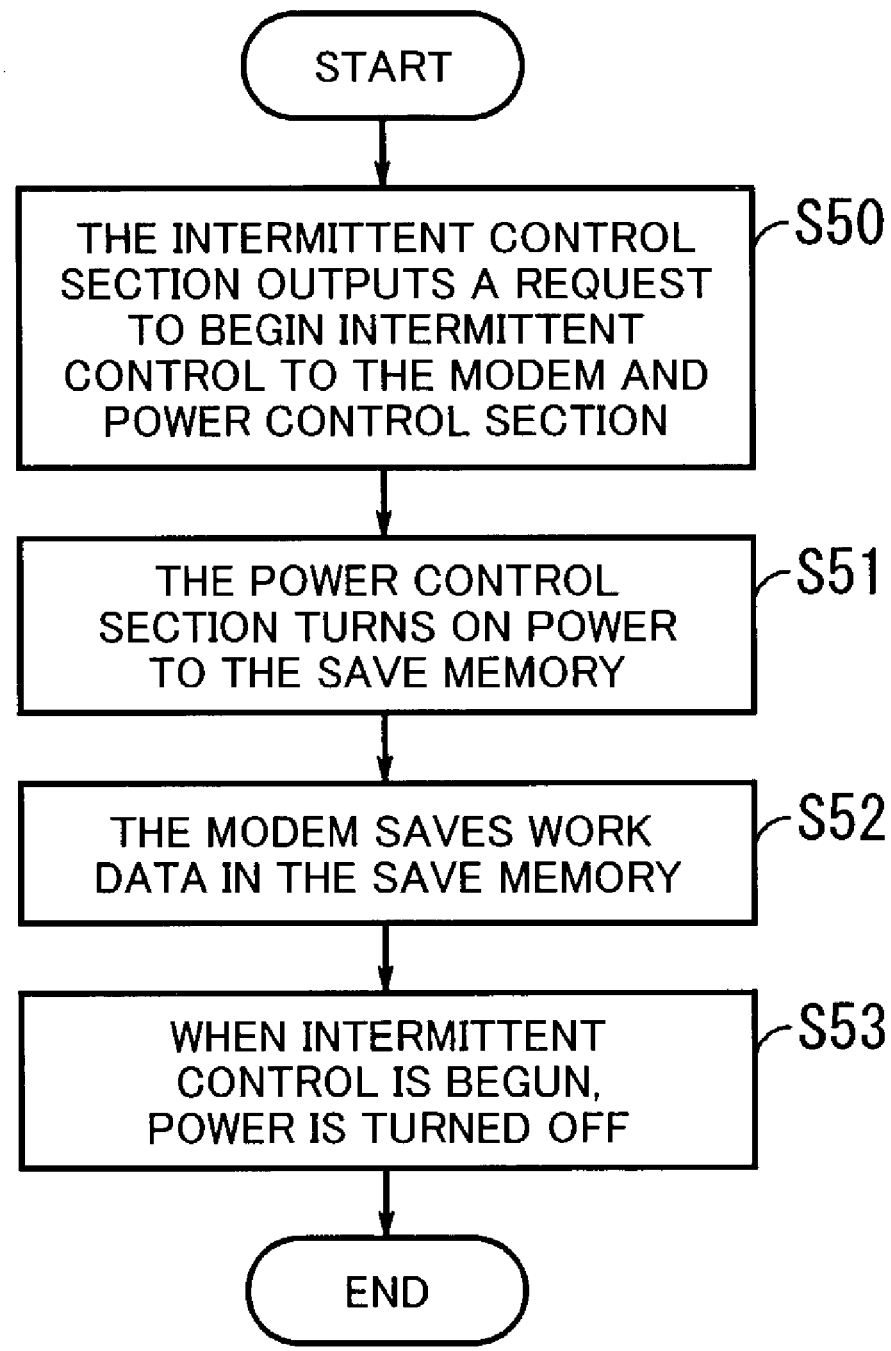
FIG. 3 is a flow chart for describing operation performed when the supply of power to a power intermittence area is stopped in the embodiment shown in FIG. 2.

First, operation performed when the supply of power to the power intermittence area 15 is stopped will be described. FIG. 3 is a flow chart for describing operation performed when the supply of power to the power intermittence area 15 is stopped. The following steps will be performed according to this flow chart.

Figure 4:
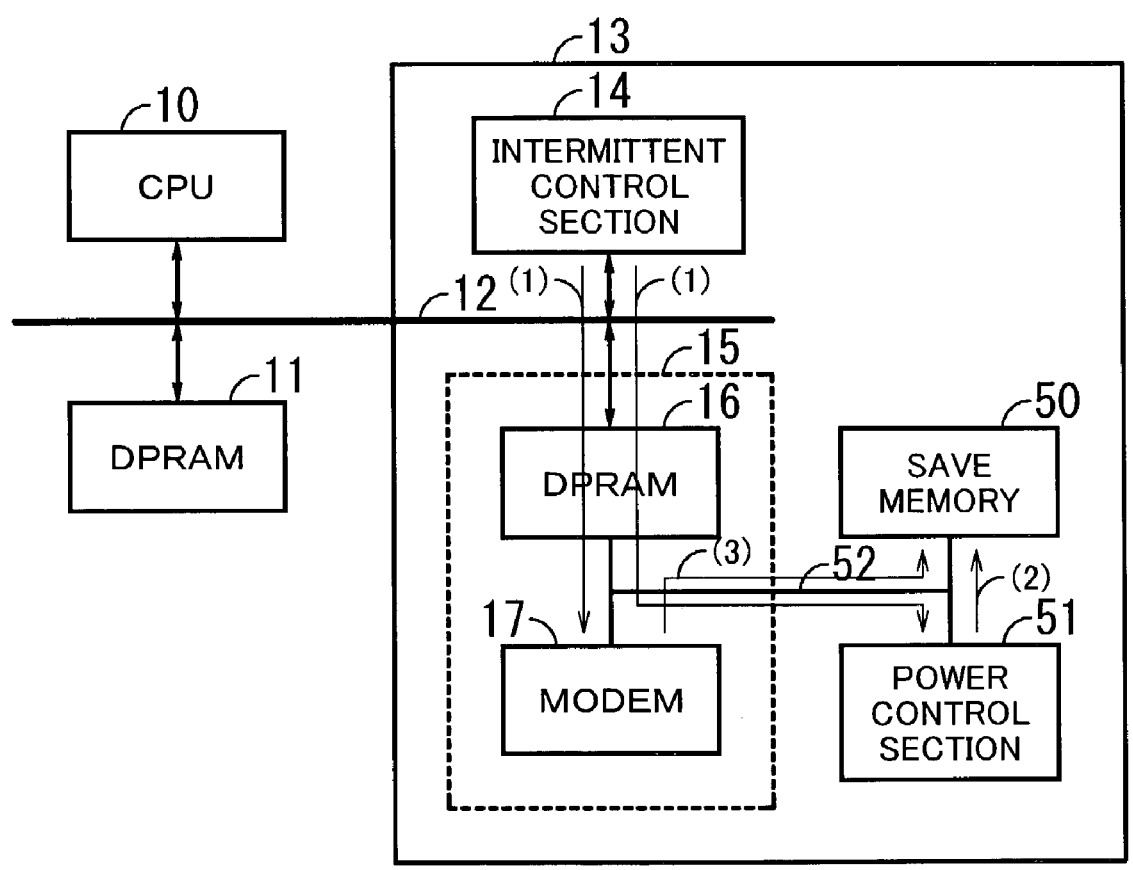
FIG. 4 is a view for describing how signals flow when the supply of power to the power intermittence area is stopped in the embodiment shown in FIG. 2.

[Step S50] The intermittent control section 14 outputs a request to begin intermittent control to the modem 17 and power control section 51 (see (1) in FIG. 4).

[Step S51] The power control section 51 turns on power to the save memory 50 (see (2) in FIG. 4).

[Step S52] The modem 17 saves work data in the save memory 50 via the bus 52 (see (3) in FIG. 4). In this case, information indicative of a location where the work data has been stored, together with the work data, is stored.

[Step S53] When intermittent control is begun, power to the power intermittence area 15 is turned off. The supply of power to an area in the modem 17 which controls communication with the intermittent control section 14 is continued.

By performing the above process, work data in the power intermittence area 15 can be saved in the save memory 50 and the supply of power to the power intermittence area 15 can be stopped.

Figure 5:
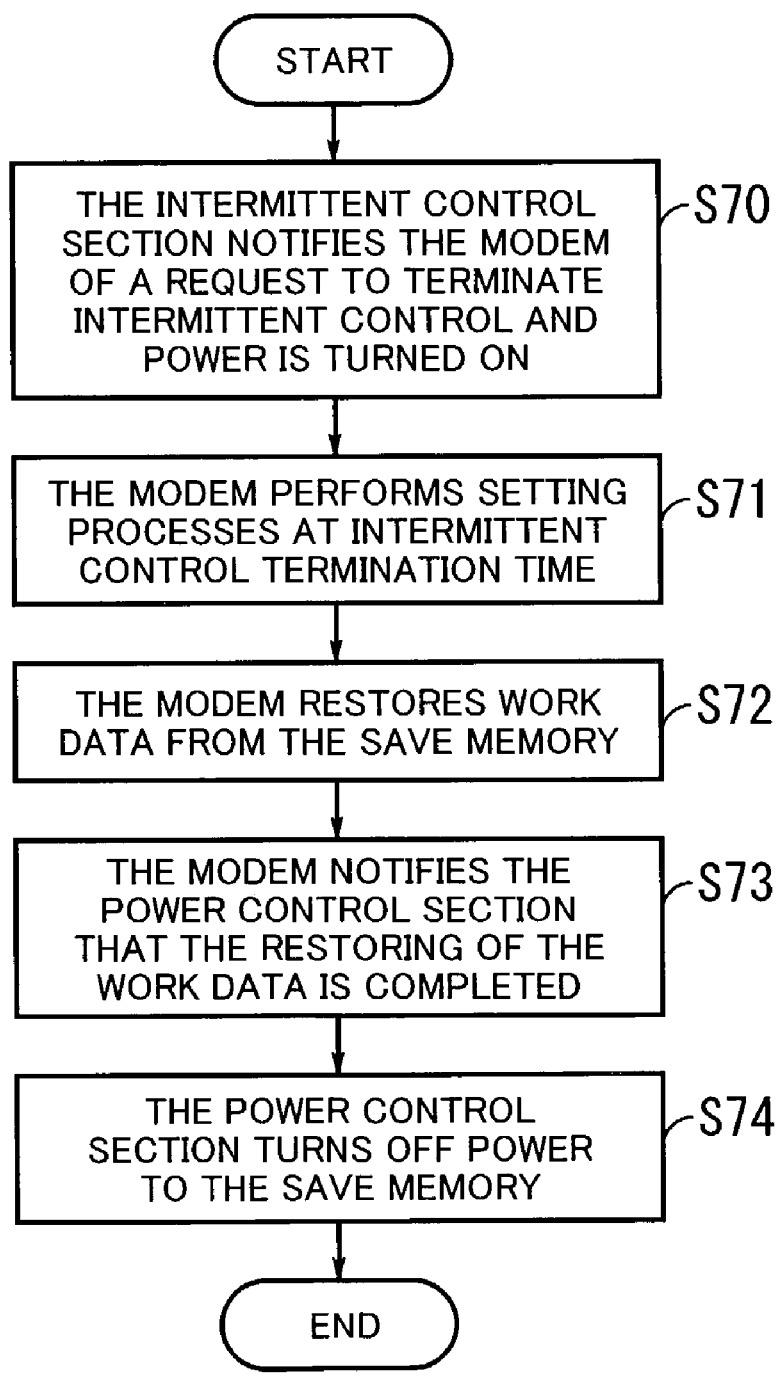
FIG. 5 is a flow chart for describing operation performed when the supply of power to the power intermittence area is resumed in the embodiment shown in FIG. 2.

Now, operation performed when the supply of power to the power intermittence area 15 is resumed will be described. FIG. 5 is a flow chart for describing operation performed when the supply of power to the power intermittence area 15 is resumed. The following steps will be performed according to this flow chart.

Figure 6:
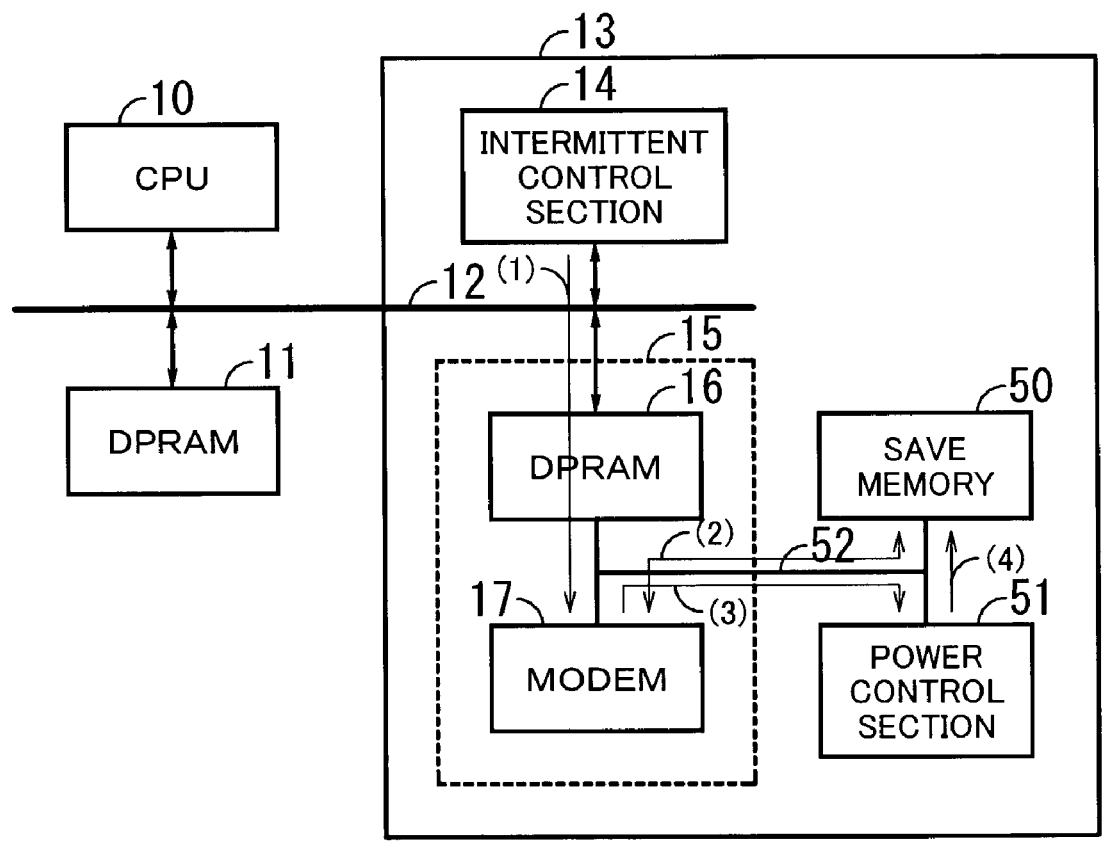
FIG. 6 is a view for describing how signals flow when the supply of power to the power intermittence area is resumed in the embodiment shown in FIG. 2.

[Step S70] The intermittent control section 14 notifies the modem 17 of a request to terminate intermittent control and power to the power intermittence area 15 is turned on (see (1) in FIG. 6).

[Step S71] The modem 17 performs setting processes at intermittent control termination time. To be concrete, the modem 17 performs the process of, for example, initializing internal registers and the like.

[Step S72] The modem 17 restores work data from the save memory 50 (see (2) in FIG. 6). In this case, the modem 17 restores the work data to the original location by referring to information indicative of the location where the work data had been stored.

[Step S73] The modem 17 notifies the power control section 51 that the restoring of the work data is completed (see (3) in FIG. 6).

[Step S74] The power control section 51 turns off power to the save memory 50 (see (4) in FIG. 6).

By performing the above process, work data saved in the save memory 50 can be restored to the power intermittence area 15 and the supply of power to the power intermittence area 15 can be resumed.

In the above embodiment, the save memory 50 is located in the LSI 13 and work data is saved in the save memory 50 via the bus 52. This prevents the CPU 10, DPRAM 11, and system bus 12 from being occupied in the case of saving or restoring work data. As a result, the load on the entire system caused by the process of saving or restoring work data can be reduced.

Moreover, the storage capacity of the save memory 50 can be set to a minimum capacity necessary for storing work data. This prevents the scale of a circuit from increasing.

Furthermore, when work data is not stored, the supply of power to the save memory 50 is stopped by the power control section 51. As a result, consumption of power can be reduced.

Figure 13:
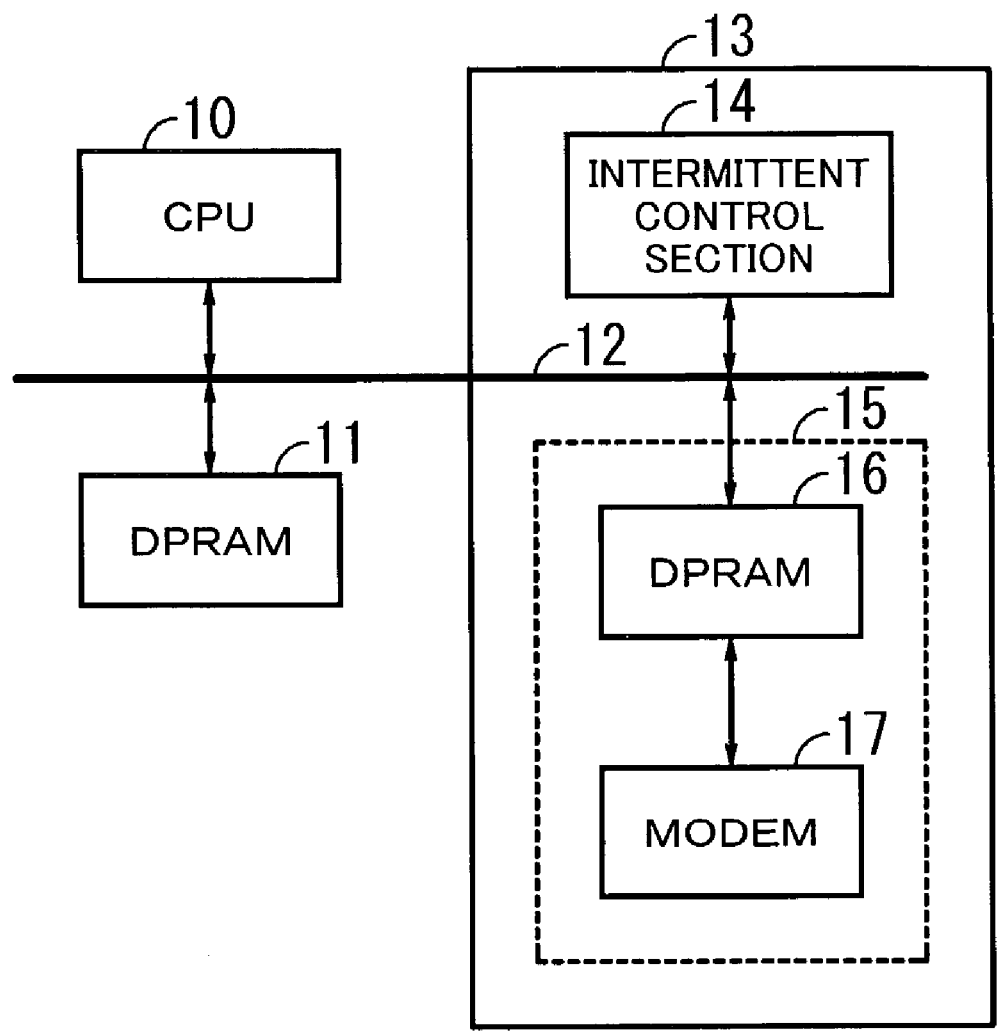
FIG. 13 is a view for describing a conventional intermittent receiving method.
Figure 14:
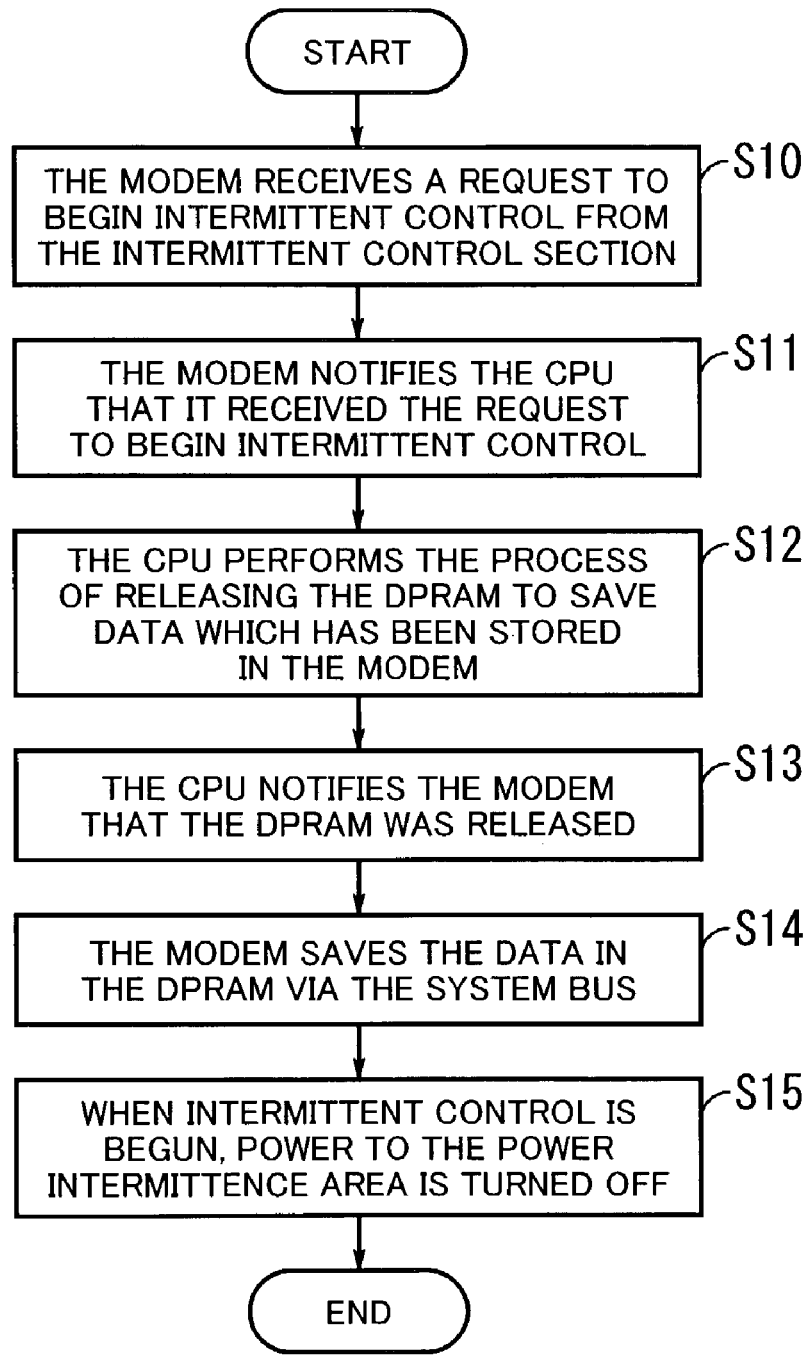
FIG. 14 is a flow chart for describing operation performed when the supply of power to a power intermittence area is stopped in the example shown in FIG. 13.
Figure 15:
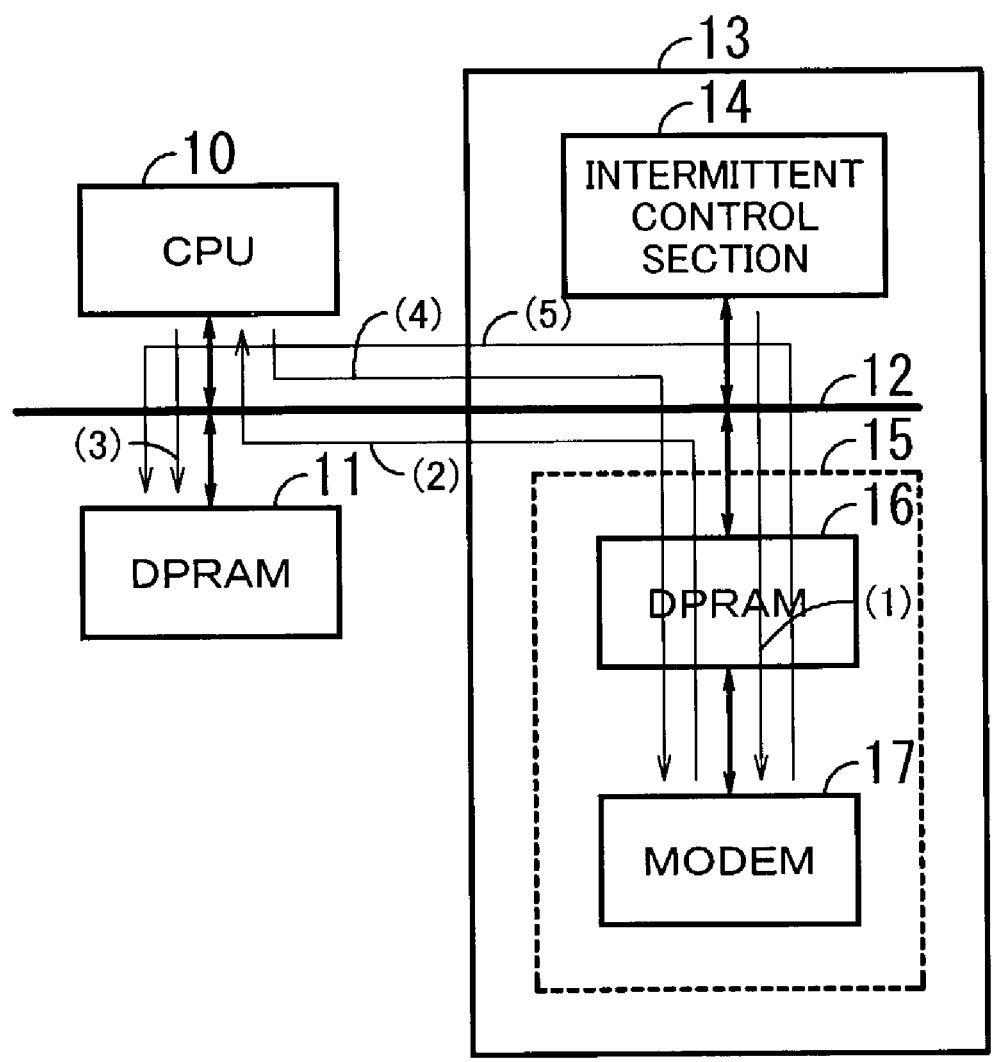
FIG. 15 is a view for describing operation performed when the supply of power to the power intermittence area is stopped in the example shown in FIG. 13.
Figure 16:
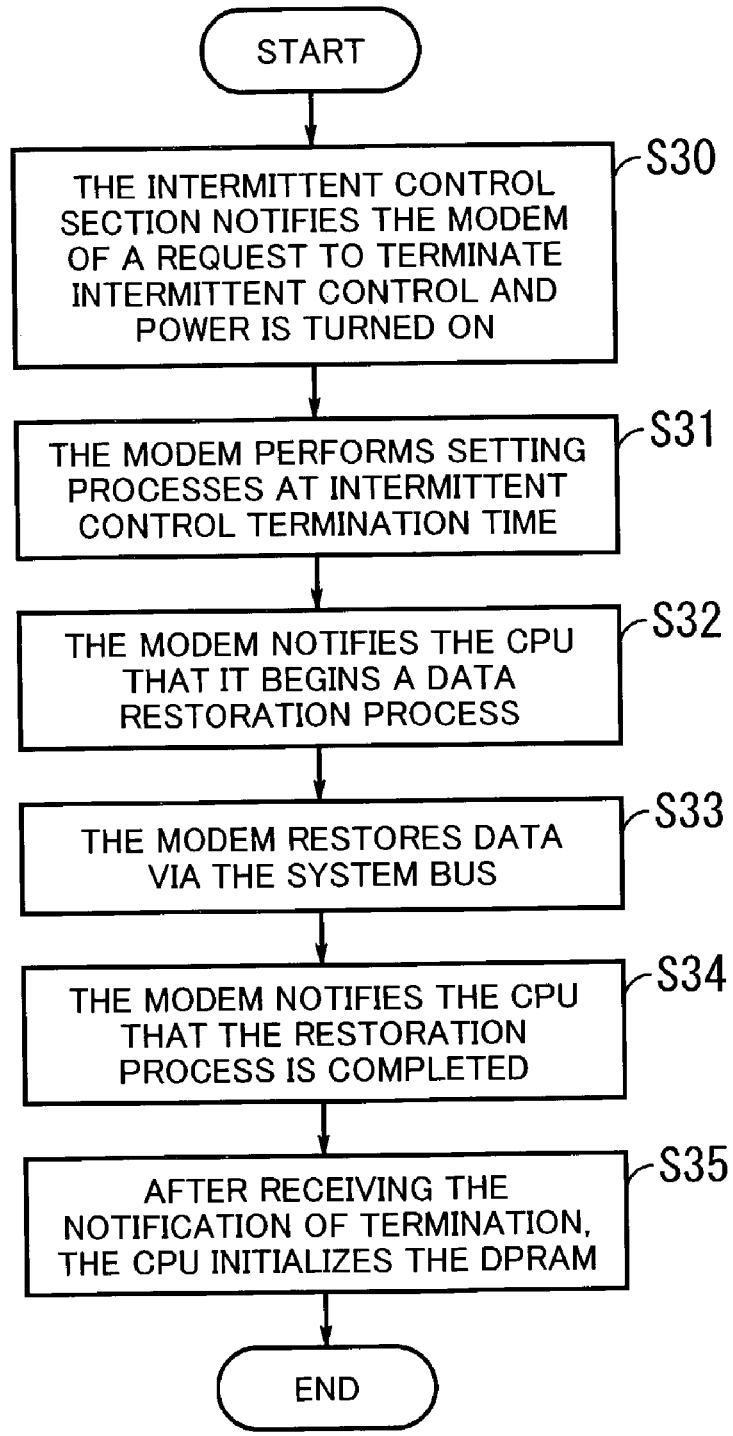
FIG. 16 is a flow chart for describing operation performed when the supply of power to the power intermittence area is resumed in the example shown in FIG. 13.
Figure 17:
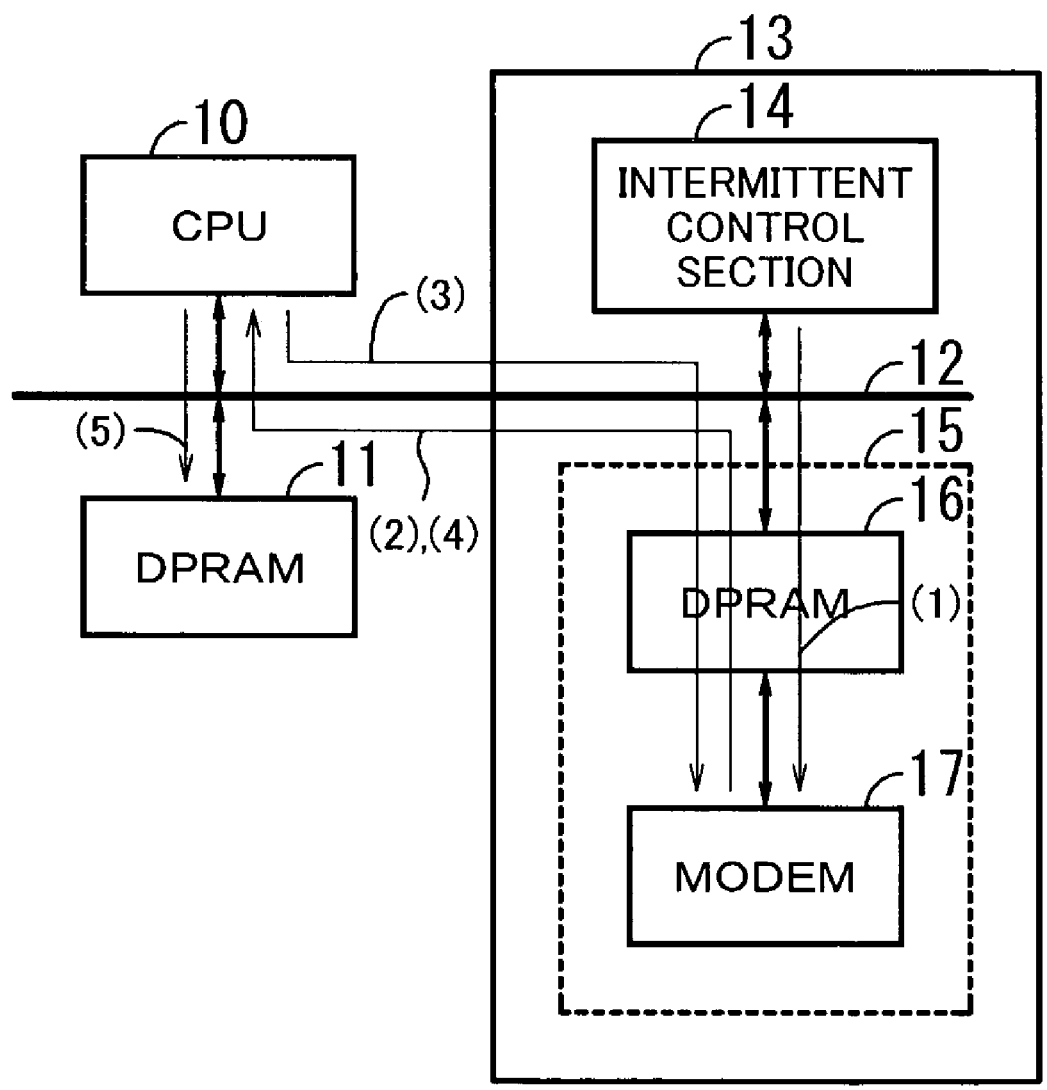
FIG. 17 is a view for describing operation performed when the supply of power to the power intermittence area is resumed in the example shown in FIG. 13.

My trial calculations show that consumption of power should be reduced by about ten percent in this embodiment, compared with the conventional structure shown in FIG. 13.

Now, another embodiment of the present invention will be described.

Figure 7:
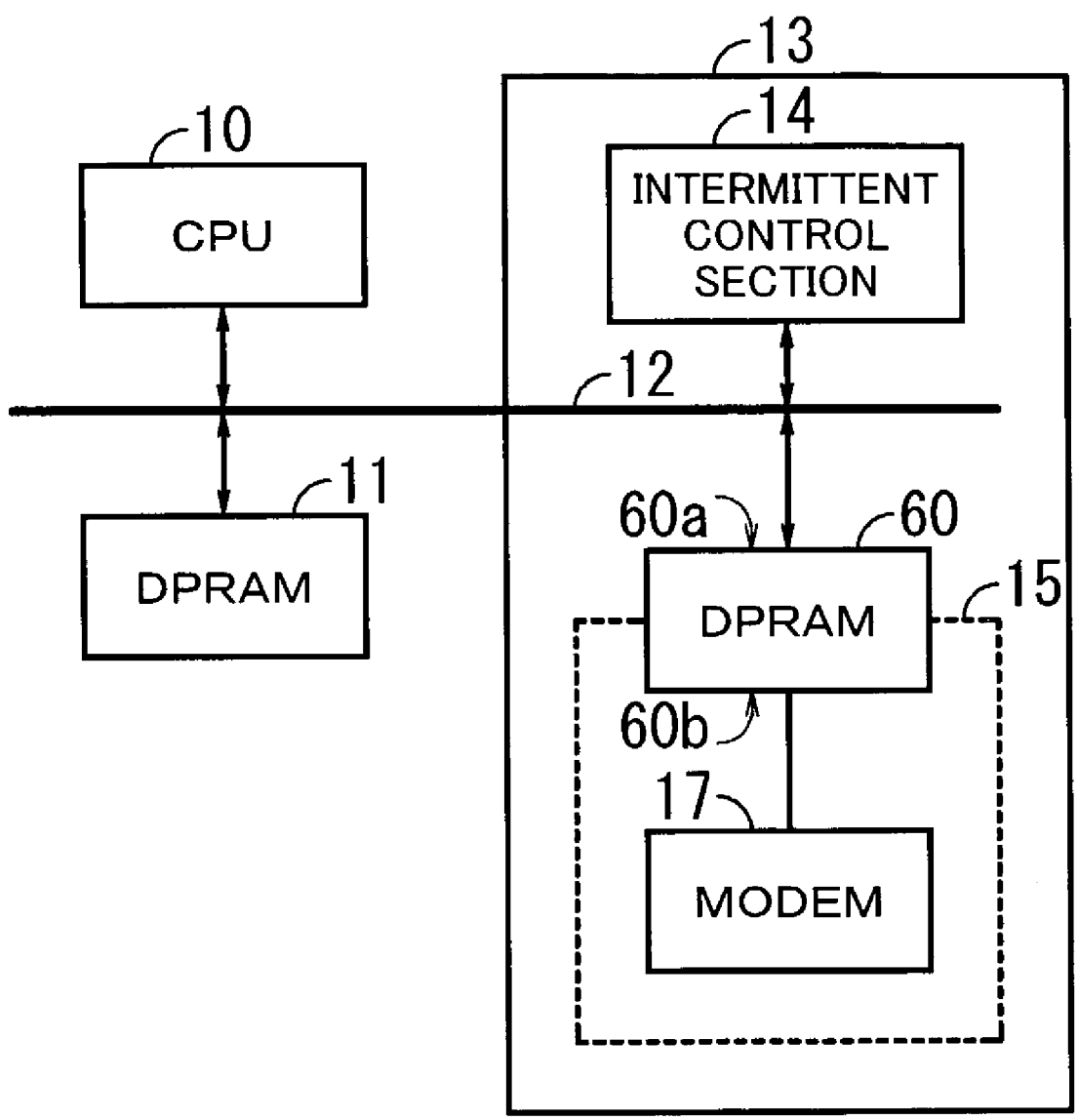
FIG. 7 is a view showing the structure of another embodiment of the present invention.

FIG. 7 is a view showing the structure of another embodiment of the present invention. As shown in FIG. 7, a unit according to another embodiment of the present invention comprises a CPU 10, a DPRAM 11, a system bus 12, and an LSI 13.

The CPU 10 controls each section of the device according to programs which have been stored in the DPRAM 11, and performs various operations.

The DPRAM 11 has stored programs executed by the CPU 10 and data.

The system bus 12 connects the CPU 10, DPRAM 11, and LSI 13 to one another so that data can be exchanged among them.

The LSI 13 includes an intermittent control section 14, a DPRAM 60, and a modem 17. The LSI 13 encodes data to be sent and decodes received data. In this embodiment part of the DPRAM 60 and the modem 17 are located in a power intermittence area 15.

The intermittent control section 14 performs the process of intermittently supplying power to the power intermittence area 15.

The power intermittence area 15 includes part of the DPRAM 60 (the details of which will be described later) and the modem 17. Power is supplied intermittently to this area.

Figure 8:
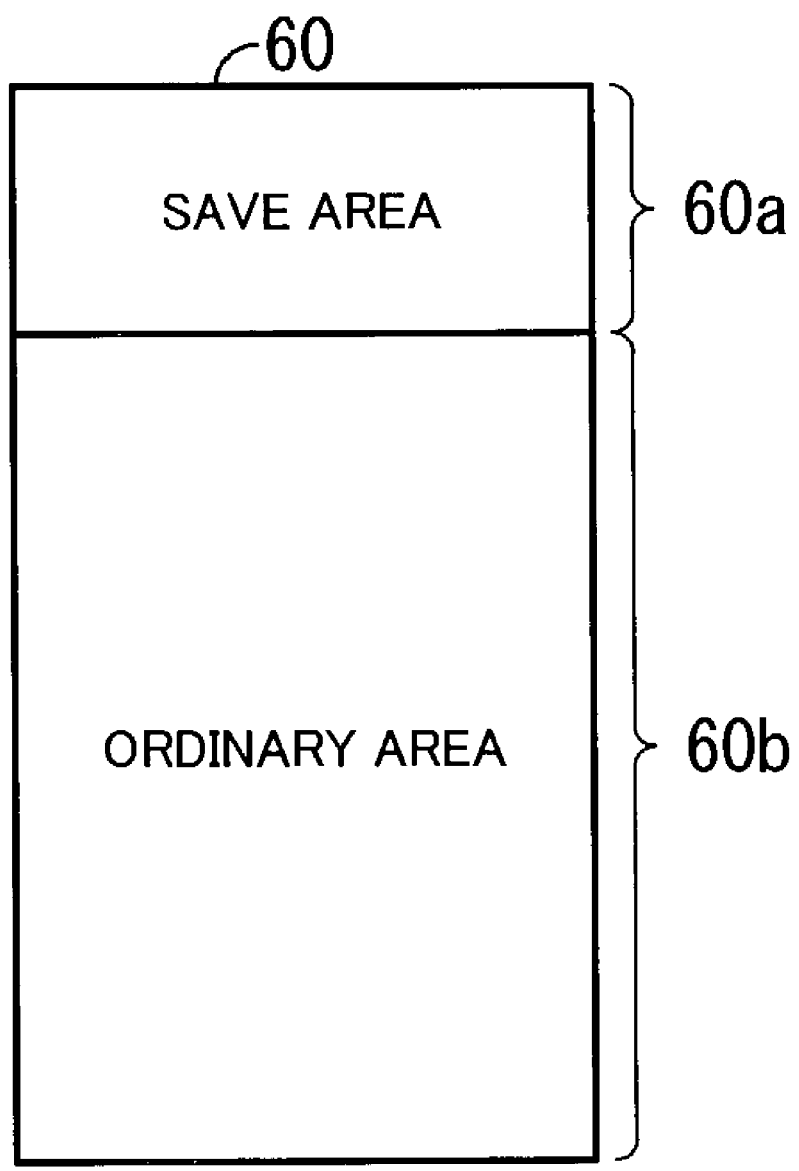
FIG. 8 is a view showing how an address space in the DPRAM shown in FIG. 7 is divided.

As shown in FIG. 8, an address space in the DPRAM 60 is divided into a save area 60a and an ordinary area 60b. The save area 60a is used for saving work data. The ordinary area 60b is used for temporarily storing data at the time of the modem 17 processing it. Power is supplied continuously to the save area 60a. On the other hand, power is supplied intermittently to the ordinary area 60b.

The storage capacity of the save area 60a is set to a minimum capacity according to the amount of work data to be stored.

The modem 17 performs the process of encoding and decoding data.

Now, operation in the above embodiment will be described.

Figure 9:
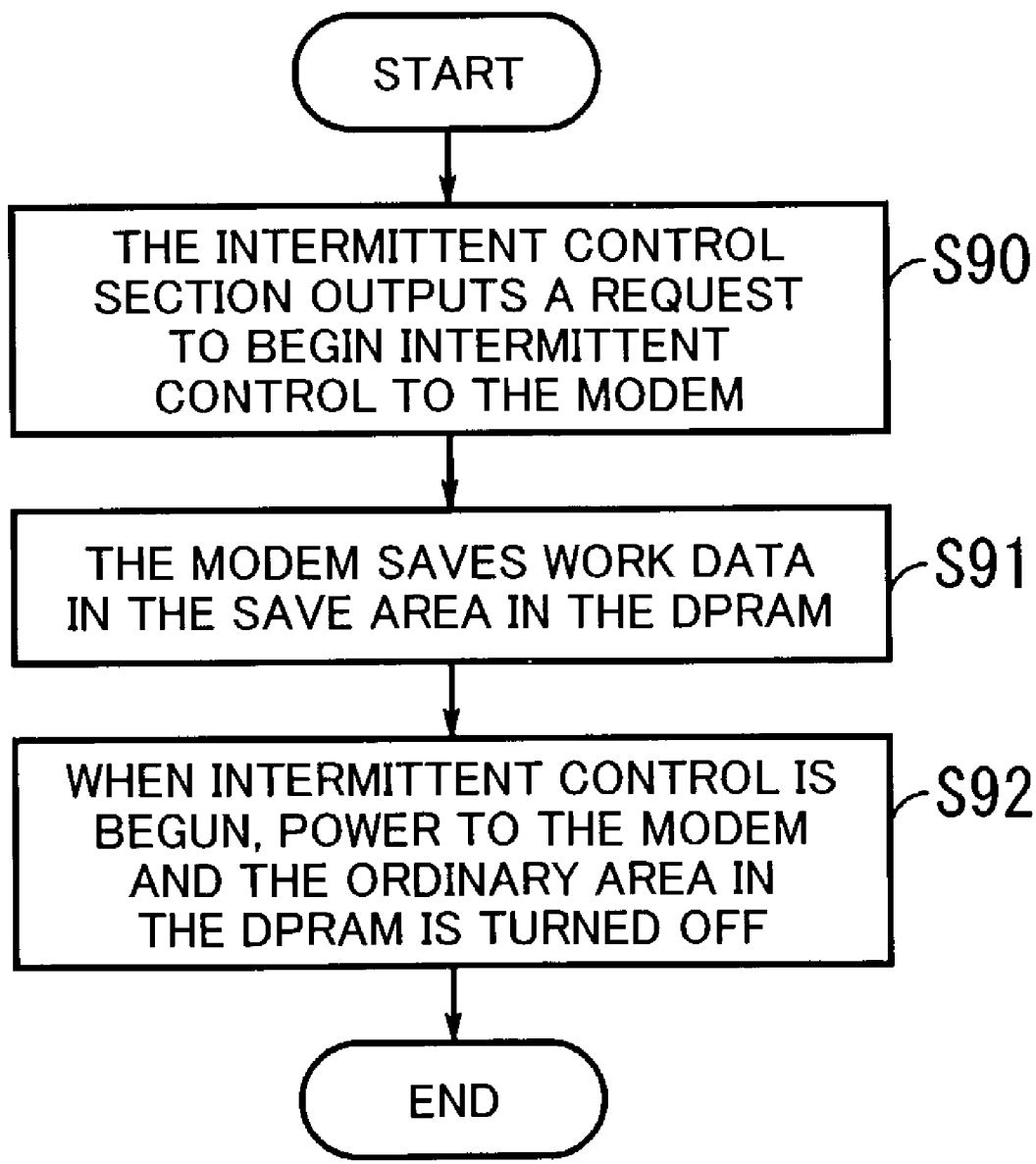
FIG. 9 is a flow chart for describing operation performed when the supply of power to a power intermittence area is stopped in the embodiment shown in FIG. 7.

First, operation performed when the supply of power to the power intermittence area 15 is stopped will be described. FIG. 9 is a flow chart for describing operation performed when the supply of power to the power intermittence area 15 is stopped. The following steps will be performed according to this flow chart.

Figure 10:
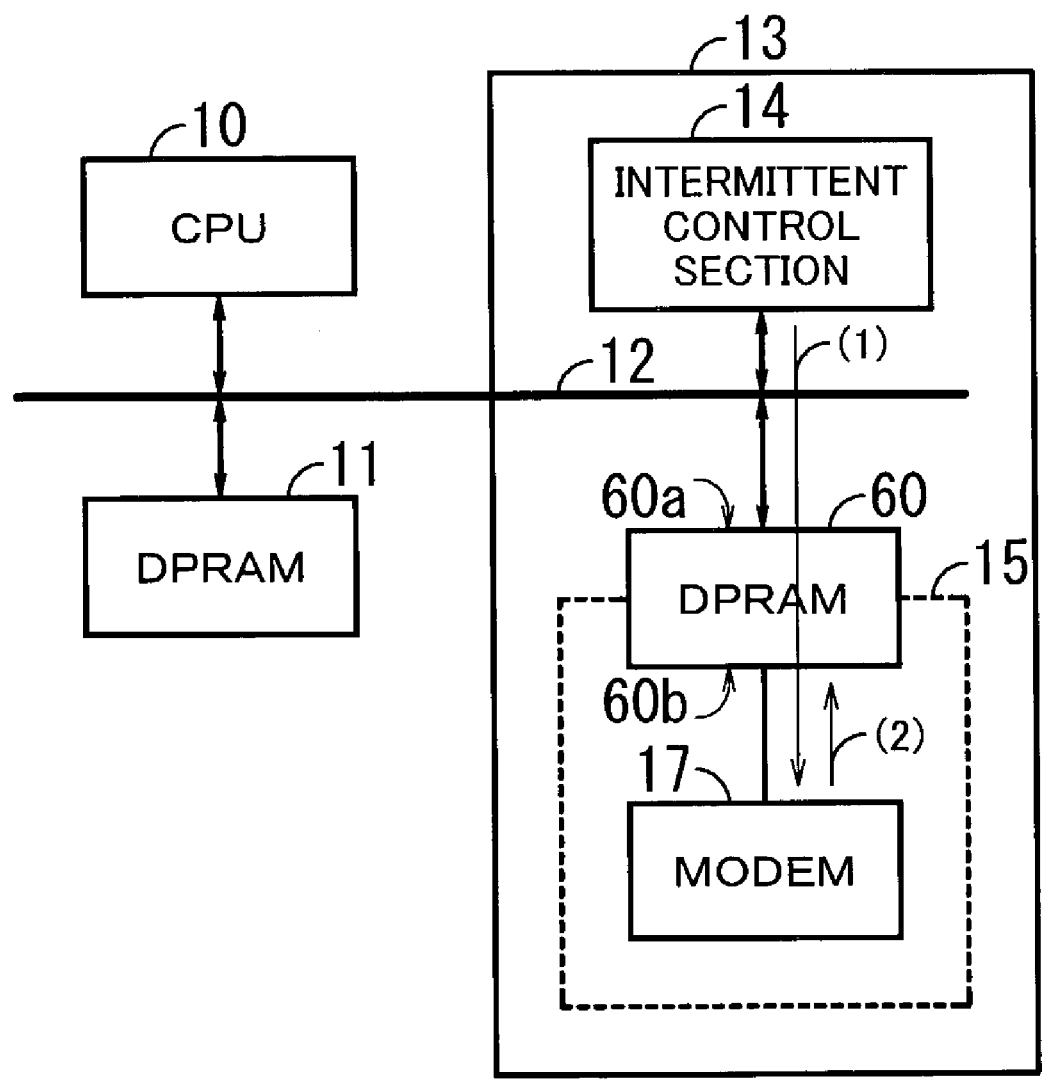
FIG. 10 is a view for describing how signals flow when the supply of power to the power intermittence area is stopped in the embodiment shown in FIG. 7.

[Step S90] The intermittent control section 14 outputs a request to begin intermittent control to the modem 17 (see (1) in FIG. 10).

[Step S91] The modem 17 saves work data in the save area 60a in the DPRAM 60 (see (2) in FIG. 10). In this case, information indicative of a location where the work data has been stored, together with the work data, is stored.

[Step S92] When intermittent control is begun, power to the modem 17 and the ordinary area 60b in the DPRAM 60 is turned off.

By performing the above process, work data in the power intermittence area 15 can be saved in the save area 60a in the DPRAM 60 and the supply of power to the power intermittence area 15 can be stopped.

Figure 11:
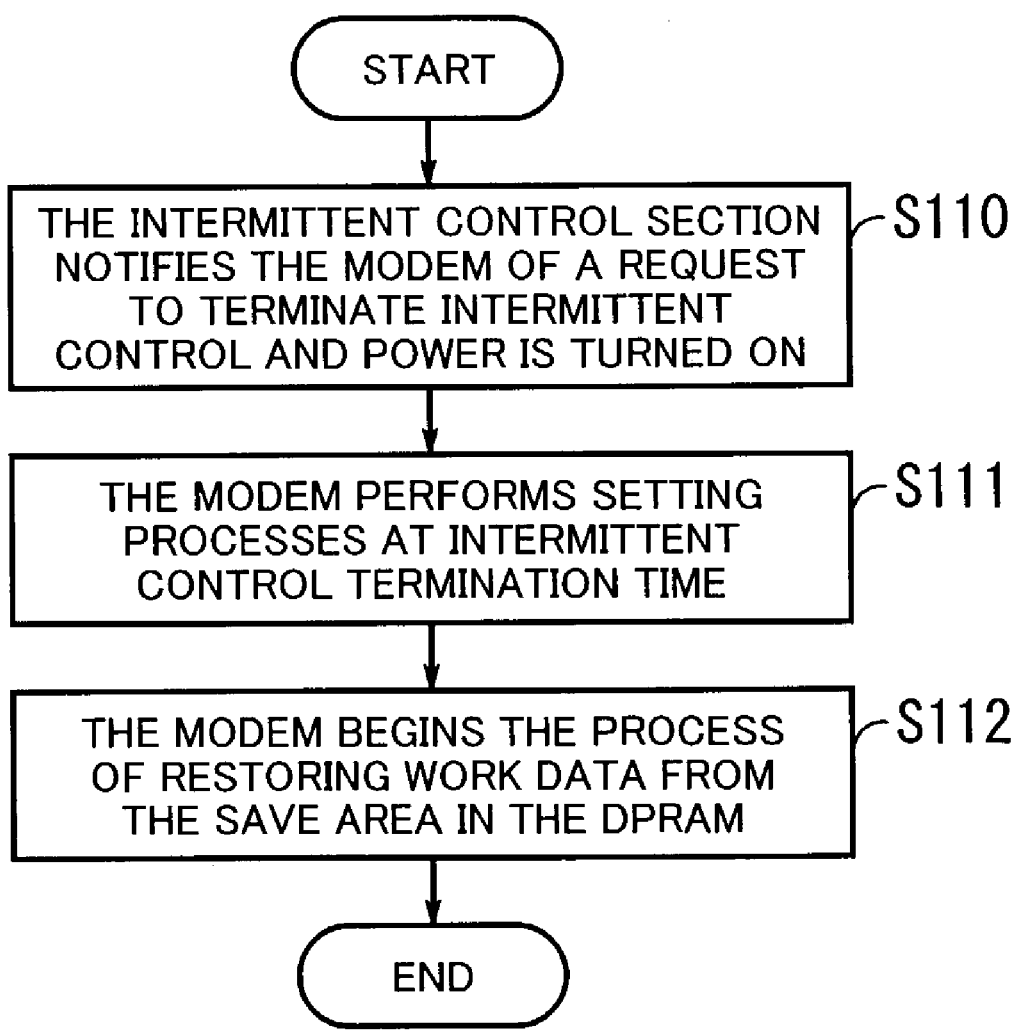
FIG. 11 is a flow chart for describing operation performed when the supply of power to the power intermittence area is resumed in the embodiment shown in FIG. 7.

Now, operation performed when the supply of power to the power intermittence area 15 is resumed will be described. FIG. 11 is a flow chart for describing operation performed when the supply of power to the power intermittence area 15 is resumed. The following steps will be performed according to this flow chart.

Figure 12:
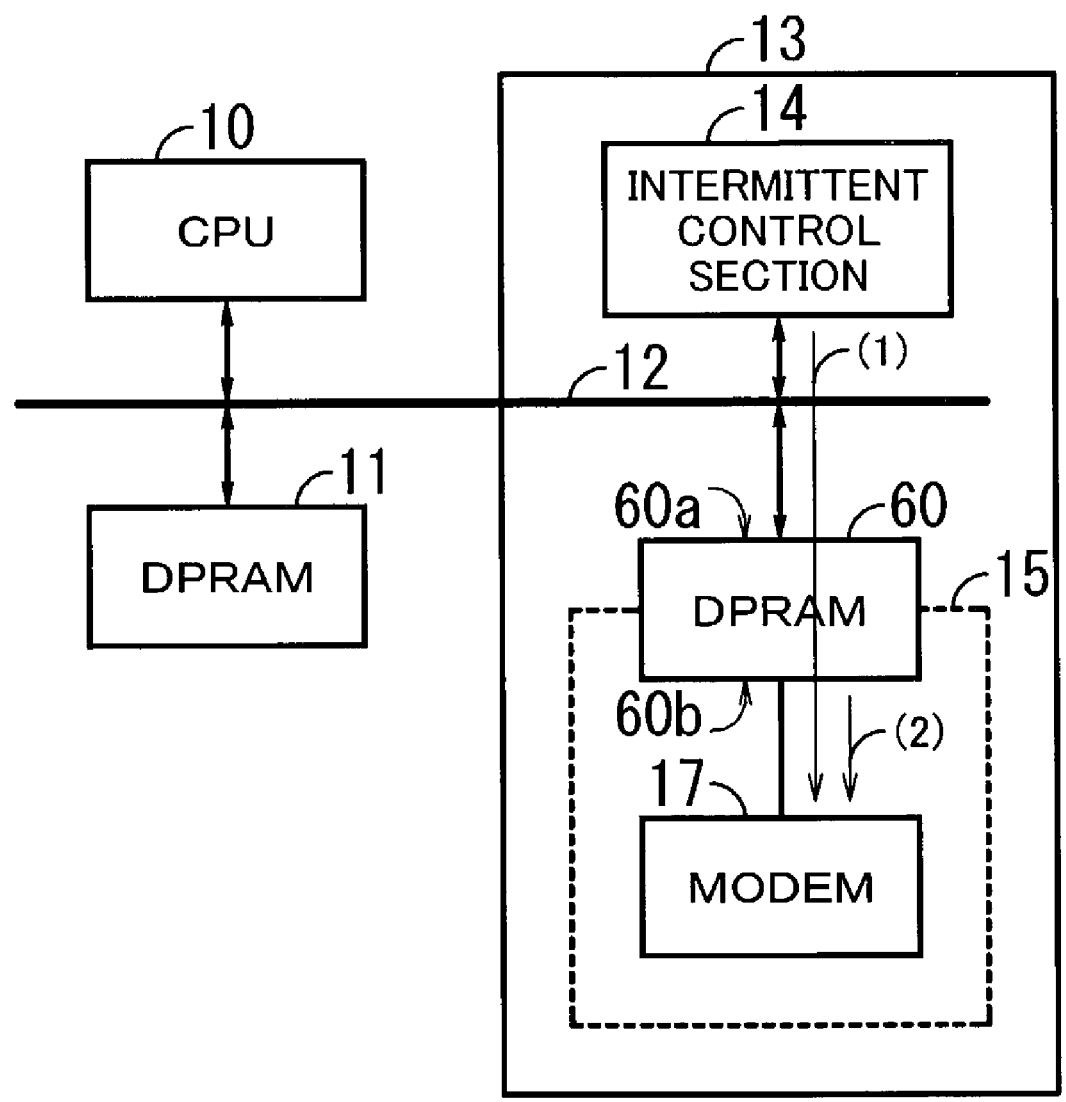
FIG. 12 is a view for describing how signals flow when the supply of power to the power intermittence area is resumed in the embodiment shown in FIG. 7.

[Step S110] The intermittent control section 14 notifies the modem 17 of a request to terminate intermittent control and power to the power intermittence area 15 is turned on (see (1) in FIG. 12).

[Step S111] The modem 17 performs setting processes at intermittent control termination time. To be concrete, the modem 17 initializes registers and the like, for example.

[Step S112] The modem 17 begins the process of restoring work data from the save area 60a in the DPRAM 60 (see (2) in FIG. 12). In this case, the modem 17 restores the work data to the original location by referring to information indicative of the location where the work data had been stored.

By performing the above process, work data saved in the save area 60a in the DPRAM 60 can be restored to the modem 17 and the supply of power to the power intermittence area 15 can be resumed.

In the above embodiment, the DPRAM 60 is divided into the save area 60a and the ordinary area 60b, power is supplied continuously to the save area 60a, and work data is saved in the save area 60a. This prevents the CPU 10, DPRAM 11, and system bus 12 from being occupied in the case of saving or restoring work data. As a result, the load on the entire system caused by the process of saving or restoring work data can be reduced.

Moreover, the storage capacity of the save area 60a can be set to a minimum capacity necessary for storing work data. This prevents the scale of a circuit from increasing.

As was not described in the above embodiment, the supply of power to the save area 60a may be stopped when work data is not stored there. This enables a reduction in consumption of power. My trial calculations show that consumption of power should be reduced by about seven percent in this embodiment, compared with the conventional structure shown in FIG. 13.

In the above embodiments the descriptions have been given with a case where the present invention is applied to a semiconductor device (LSI 13) as an example. However, it is a matter of course that the present invention is not limited to such a case. The present invention is applicable to various electronic devices.

As has been described in the foregoing, a semiconductor device including a first area to which power is supplied intermittently and a second area to which power is supplied continuously, according to the present invention, comprises a memory located in the second area, a save circuit for saving data used in the first area in the memory before stopping the supply of power, and a restoration circuit for restoring data saved in the memory to a predetermined circuit in the first area. Therefore, by locating a memory in the semiconductor device and saving data in the memory, an increase in the load on another device in a system using the semiconductor device can be prevented.

Furthermore, an electronic device including a first circuit to which power is supplied intermittently and a second circuit to which power is supplied continuously, according to the present invention, comprises a memory located in the second circuit, a save circuit for saving data used in the first circuit in the memory before stopping the supply of power, and a restoration circuit for restoring data saved in the memory to a predetermined portion in the first circuit. Therefore, data can be saved or restored without increasing consumption of power.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method for saving data in a semiconductor device including a first area to which power is supplied intermittently and a second area to which power is supplied continuously, the method comprising the steps of:
   saving data in the first area to the second area; and
   stopping the supply of power to the first area;
further comprising the prior steps of:
   outputting an intermittent control start request to a modem in the first area and a power control section in the second area; and
   the power control section which accepted the intermittent control start request turning on power of the second area, wherein the modem which accepted the intermittent control start request saves the data in the first area to the second area; and
   stopping the power supply to the first area at the time intermittent control is begun.

2. A method for saving data in a semiconductor device including a first area to which power is supplied intermittently and a second area to which power is supplied continuously, the method comprising the steps of:
   saving data in the first area to the second area; and
   stopping the supply of power to the first area;
further comprising the prior step of:
   outputting an intermittent control start request to a modem in the first area, wherein the modem which accepted the intermittent control start request saves the data in a first memory area of a memory to a second memory area of the memory, the memory having the first memory area in the first area and the second memory area in the second area; and
   stopping the power supply to the first memory area at the time intermittent control is begun.

* * * * *